United States Patent [19]

Oldham

[11] Patent Number: 4,789,972
[45] Date of Patent: Dec. 6, 1988

[54] SELECTIVELY CONTROLLING THE ERASURE IN A MAGNETO-OPTIC RECORDING MEDIUM

[75] Inventor: David M. Oldham, Tucson, Ariz.
[73] Assignee: International Business Machines Corporation, Armonk, N.Y.
[21] Appl. No.: 944,407
[22] Filed: Dec. 22, 1986
[51] Int. Cl.[4] .................. G11B 11/12; G11B 13/04
[52] U.S. Cl. ..................... 369/13; 360/114; 360/59; 365/122
[58] Field of Search .................. 369/13; 360/114, 59; 365/122

[56] References Cited

U.S. PATENT DOCUMENTS

| | | | |
|---|---|---|---|
| 3,821,703 | 6/1974 | Irivin et al. | 371/38 |
| 4,412,264 | 10/1983 | Imamura | 360/131 |
| 4,472,748 | 9/1984 | Kato et al. | 360/59 |
| 4,539,662 | 9/1985 | Hatano | 369/13 |
| 4,670,865 | 6/1987 | Hatano | 360/114 |
| 4,701,894 | 10/1987 | Watson | 360/114 |
| 4,701,895 | 10/1987 | VanSant | 369/13 |

FOREIGN PATENT DOCUMENTS

| | | | |
|---|---|---|---|
| 0153676 | 4/1985 | European Pat. Off. | |
| 57-24046 | 8/1982 | Japan | |
| 61-214265 | 9/1986 | Japan | 369/13 |
| 61-229247 | 10/1986 | Japan | 360/114 |
| 369613 | 2/1973 | U.S.S.R. | |
| 2101793 | 1/1983 | United Kingdom | |

Primary Examiner—Raymond F. Cardillo
Assistant Examiner—Hoa T. Nguyen
Attorney, Agent, or Firm—H. F. Somermeyer

[57] ABSTRACT

In a magnetic recorder, magnetooptic, for example, the erasure dirction for successive recording areas (sectors) are determined by the direction of magnetization of prior recording. A mark is placed in each sector for identifying its erasure direction.

15 Claims, 3 Drawing Sheets

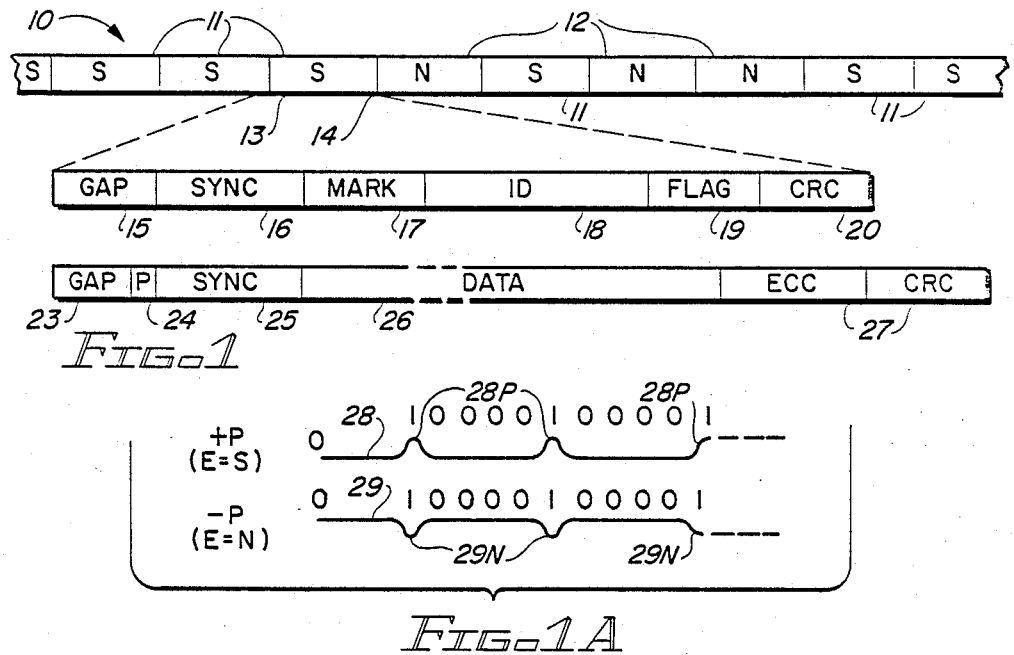
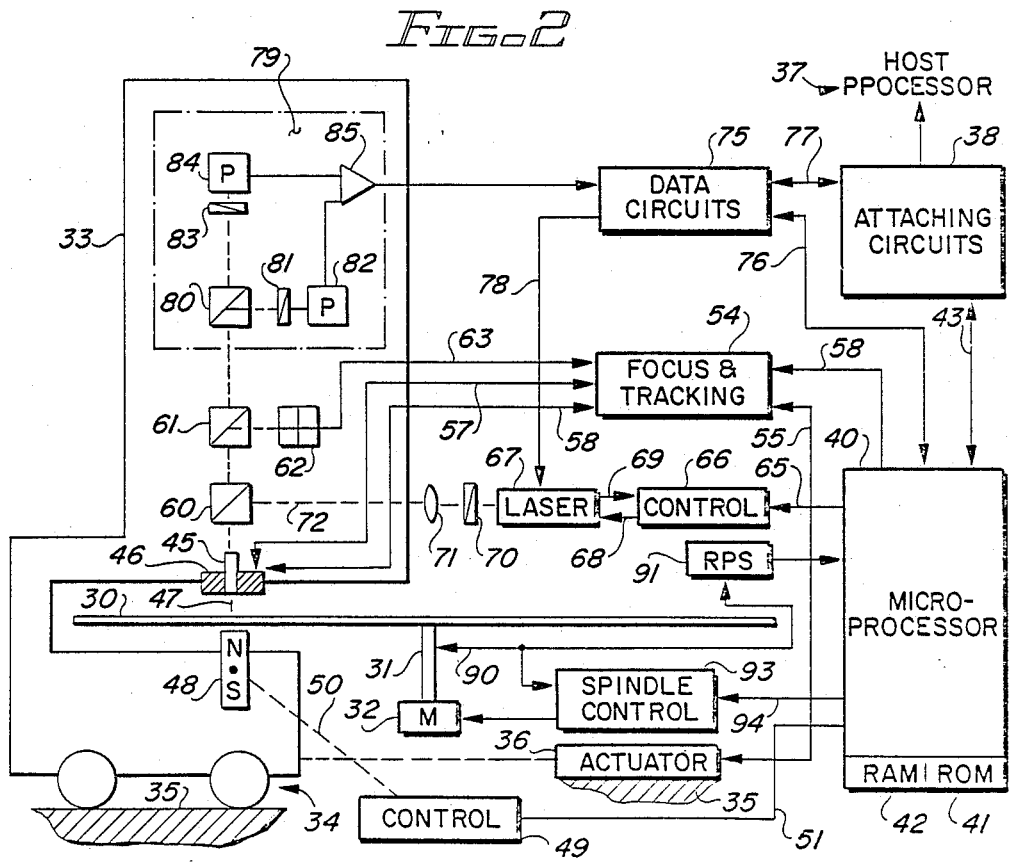

SELECTIVELY CONTROLLING THE ERASURE IN A MAGNETO-OPTIC RECORDING MEDIUM

FIELD OF THE INVENTION

This invention relates generally to magnetic recording, particularly to magneto-optic recording.

DISCUSSION OF THE PRIOR ART

Magnetic recording, including magneto-optic recording, generally defines one direction of magnetic remanence as being an erased, or erasure, direction commonly referred to as a binary zero. Recording information is usually arbitrarily defined as a binary one and is represented in the record member as magnetic remanence with a magnetic direction opposite that to the erasure direction. For ease of discussion, it is arbitrarily denoted that the usual erasure direction is a south pole magnetic field emanating from the recording or readback surface of the record member. Such definition assumes that vertical recording is employed, i.e., the magnetic dipole is located inside the record member transversely to the plane of the record member. Recorded information is arbitrarily defined as a north magnetic field emanating from such recording surface. Such definition is necessary for ensuring the faithful reproduction of information-bearing signals recorded in the record medium. Many magnetic recording media are arbitrarily divided into areas defined as bit areas, i.e., that area of a record medium capable of storing one bit of information which is represented by either a south or north pole emanating from the recording surface. A published example of such usage, which is notoriously well known before the publication, is found in published unexamined patent applications from Japan 57-24046 dated Feb. 8, 1982. This publication shows a bit area denominated by numeral 1a with an erase field 5 and a write or recording field 3. Magnetic flux 2 is shown as entering the bit area which in this illustration is a recorded or south pole, i.e., opposite to that defined above which illustrates the arbitrariness of the such definition.

UK Patent Application GB No. 2,101,793 shows a typical magneto-optic recorder wherein the recording magnetic field is supplied by an electromagnetic coil 2' with a recording laser heating the magneto-optic coating for effecting the recording. This patent application teaches that a recorded control signal indicates whether or not the information recorded on the medium may be erased. It is pointed out that the arbitrary erasure direction is constant throughout the record medium. European Application publication No. 0,153,676 published Sept. 4, 1985 teaches that the leakage magnetic field of an actuator moving a head is in the same sense as the erasure direction of the recording medium. This patent is cited to show the importance of maintaining the direction of the erasure field for ensuring integrity of the recording.

USSR Pat. No. 369,613, May 25, 1973 shows a line magnetic recording method. The method is based upon a sequential effect of a magnetic carrier on a single pole erasing pulses and recording pulses of opposite polarity, i.e., the arbitrary definition mentioned above. The patent goes on to say that with a simultaneous reduction of the width of the reverse magnetizable zone of the magnetic carrier, the quality of the recording can be improved, i.e., the width of the reverse magnetizable zone of the carrier is reduced independently of the value of the erasing and recording pulses. The constants which effect consecutive amplitudes of the erasing pulses and change them alternately according to a value which is a function of the level of recordable signal. The recording head consists of a conductor with a photoconducting plate having an optical system which includes a light flux. Here the electric fields combine with the light flux to perform a recording but follow the arbitrary definition of erasure and information as set forth above.

U.S. Pat. No. 4,412,264 is a further example of using arbitrarily-defined erasure and recording directions. U.S. Pat. No. 4,539,662 is another example of a magneto-optic recorder. In the latter patent, a recording track erasure direction is of opposite polarity to the remanent magnetization of the area intermediate two record tracks. Such an arrangement replaces track-indicating grooves normally found in optical disks; it still follows the rule that an erasure direction must always be the same on a given record medium.

It has been a practice to insert timing or synchronization signals into each addressable area of a tape or disk record. The purpose of such signals is to establish clock timing in readback circuits used for recovering data from the record. Included in such signals is a mark signal identifying the boundary between the timing signals and ensuing recorded data signals. Such mark signal establishes the phase of the clock whereas the timing signals can often only establish frequency of the clock. Both parameters have to be established in many recording schemes. An example of such an arrangement is shown in U.S. Pat. No. 3,821,703, particularly in FIGS. 2 and 4. Such signals are recorded and readback with an assumed single erasure direction in magnetic recording, as set forth above.

Some magneto-optic recorders, employ a rotatable permanent magnet for supplying reversible magnetic biasing fields to be used during a recording operation. Other magneto-optic recorders employ an electrically-actuated coil for producing the reversible magnetic-biasing field. For an erasure, the magnetic field is supplied such that the south field is imposed upon the record medium, then the light from a laser impinges onto the record medium for heating same such that all of the information-bearing areas to be erased then have south-emanating remanent magnetizations.

Two problems arise in such recording procedures. The first is a latent time for reversing the erasure and recording directions. This delay, as a practical matter when employing random-access techniques, i.e., such as are found in the data processing environment, requires three rotations of a magneto-optic disk for recording information. The first rotational period or portion thereof is required to redirect the magnetic field from the recording direction to the erasure direction, i.e., during recording operations, the magnetic field is normally in the recording direction such that the north field is imposed upon the record member. Whether recording occurs or not is determined by whether a laser is activated to heat the area in the recording area. A second rotational period is used for erasing the area which is to receive information, i.e., currently in magneto-optics before data is recorded, the prior data must be erased. So far, up to two rotations of the magnetic record member have been required for just erasing a previously-recorded information. The third rotation is for actually recording the data. It is to be appreciated that the three rotations are a maximal delay. A fourth rotation of the record medium could be required if verification of the recording is desired. Such delays are generally in the order of milliseconds which, in a data processing environment, are unacceptable. Accordingly, it is desired to drastically reduce the latency times for effecting recording of information on a record medium, such as a rotating magneto-optic disk, without changing the integrity of the recorded information.

SUMMARY OF THE INVENTION

It is an object of the invention to enable reduction of the number of magneto-optic disk rotations for recording information-bearing signals on such disks. In accordance with the present invention, the erasure direction of the recording area is selectively made equal to the data-indicating recording direction of the last-recorded data. An erasure-direction mark is recorded in the recording area for indicating each designated erasure direction. Provisions are made for arbitrarily erasing portions of the disk to the originally-denominated erasure direction. In a preferred mode of the invention, the erasure direction indicating mark is recorded independently of the direction of the magnetic field used for recording the information.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 1 is a diagrammatic showing of a portion of a record member employing the teachings of the present invention.

FIG. 1A schematically illustrates an erasure-direction indicating mark usable with the FIG. 1-illustrated record member.

FIG. 2 is block diagram of a magneto-optic recorder-reader employing the invention and usable with the FIG. 1 illustrated record member.

DETAILED DESCRIPTION OF THE PREFERRED EMBODIMENTS

Figure 3:
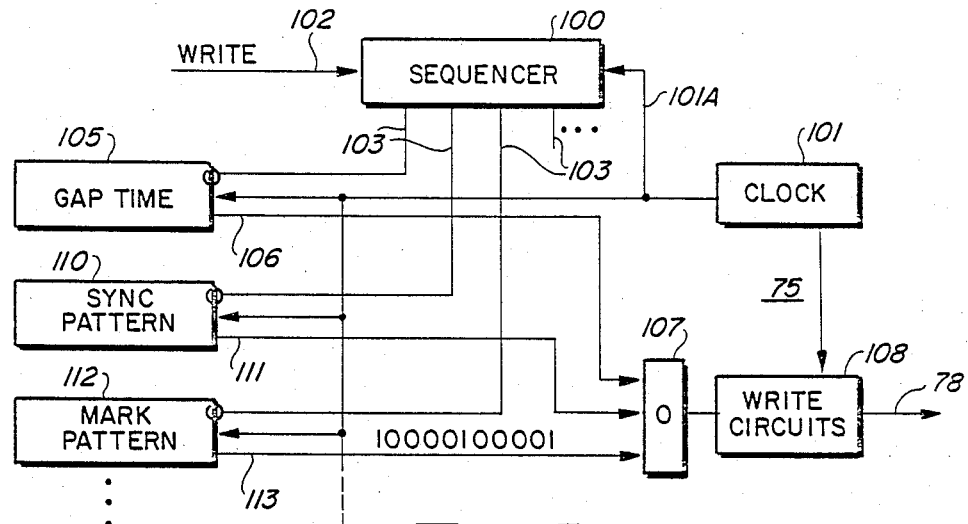
FIG. 3 is a simplified showing of a recording circuit control usable in the FIG. 2-illustrated recorder-reader.

Referring now more particularly to the drawing, like numerals indicate parts and structural features in the various diagrams.

A single record track 10 is shown in FIG. 1. Such record track is preferably a circular track on a circular magneto-optic disk, such as disk 30 (FIG. 2). A plurality of such record tracks can either be a series of concentric tracks, such as normally found in data processing environments, or a single spiral track having a plurality of circumvolutions, such as usually found in video disks, audio disks, and in some data processing or data recording disks. In any event, information-bearing signals are recorded in track 10 in a plurality of addressable sections 11, 12 hereinafter referred to as "sectors". It is preferred that the sectors on all of the tracks or circumvolutions be radially aligned such that all sectors in all tracks can be easily addressable using rotational and radial positions.

Initially, track 10 has an erasure direction S wherein the magnetic flux field on the recording surface enters the record medium. Sectors having such an erasure direction south are collectively indicated by numeral 11. Some of the addressable sectors in track 10 have an erasure direction of north as collectively indicated by numeral 12. What happens, in accordance with the present invention, is that one of the sectors 11 was written to or other recording operations were employed. Then, a host processor 37 (FIG. 2) demanded the recorder to record data in such sectors. Rather than change the direction of the magnetic field, the erasure direction was changed in the sectors 12 such that a rotation of the disk 30 is eliminated in the recording operation. With the erasure direction being arbitrarily denominated as being north, then all binary ones, i.e., normally represented by the north remanent magnetization, are recorded as the south remanent magnetization i.e., the normal erasure direction. This change eliminates the requirement for changing the biasing magnetic field to the erasure direction. In those recorders employing rotatable magnets, the first-required rotation is eliminated thereby reducing the number of disk rotations to a maximum of two. For those recorders employing an electric coil generated magnetic field, the number of sectors scanned during the reversal of the magnetic field is less; however, the same problem occurs and a similar advantage accrues from practicing the present invention.

Each of the sectors in track 10 include an identification portion 13 followed by a trailing data storing portion 14. In each identification portion 13 there is an identifying gap 15 followed by a synchronization field 16 (sync). The gap and sync fields 15 and 16 are well known in optical and magnetic recording and are not further described for that reason. The sync field 16 contains signals for synchronizing the timing circuits of the recorder. Following sync field 16 is a mark 17 which contains a unique recorded signal pattern identifying the erasure direction and can double as an indicator for onset of data. Following mark 17 is the identification field ID 18 which contains the track number and sector number and other identifying data such as record number, data set identification, and the like. Flag field 19 contains signals indicative of the quality of the sector and other control signals incident to a magnetic or optical recorder. CRC field 20 contains a cyclic-redundancy check redundancy for verifying the accuracy of recorded fields 15–19.

The data storing portion 14 of each sector in track 10 begins with a gap 23 which is constructed similarly to gap 15, i.e., may be an erased portion or a tone may be recorded therein. Gap 23 usually resides immediately adjacent to CRC field 20. Pattern bit P 24 is a unique pattern signifying that the ensuing portion contains user data, i.e., information-bearing signals. If P=0, no data has been recorded; when P=1, data has been recorded. Sync 25 synchronizes the timing of the recorder which is followed by the actual data recording in area 26. Sync 25 may be terminated by a unique mark signal as is well known in the recording art. ECC and CRC fields 27 (error-correction code and cyclic-redundancy check) operate to detect and correct recording errors, as is well known.

FIG. 1A illustrates a unique readback signal pattern constituting mark 17. When the erasure direction is a south pole (E=S), the pattern 28 is recorded having three positive (north) signals 28P separated by a string of four south erasure or zero signals. Signal 29 having negative peaks 29N (south) separated by four recorded signals (north zeros) to indicate a north erasure direction. The relatively long half wavelength (four consecutive zeros) between successive one signals enables the pattern to be identified as having either positive peaks 28P of signal 28 or negative peaks 29N of signal 29. The long half wavelengths also enable the readback circuit to more easily detect the polarity of the peaks 28P and 29N for reliably indicating the selective erasure direction for the instant sector. The signal integral of signals 28 or 29 indicate the erasure direction polarities. As will become apparent, readback circuits respond to the FIG. 1A-illustrated readback signals to identify erasure direction for each sector. It is preferred that the long one-half wavelengths in signals 28, 29 be comparable to longer wavelengths of information-bearing signals on the record member. Such selection limits the dynamic range of the signals recorded yet provides a reliable erasure direction indicator.

An optical recorder with which the present invention may be advantageously employed is shown in FIG. 2. A magneto-optic record disk 30 is mounted for rotation on spindle 31 by motor 32. Optical head carrying arm 33 on head arm carriage generally denoted by numeral 34 moves radially of disk 30. A frame 35 of recorder suitably mounts carriage 34 for reciprocating radial motions. The radial motions of carriage 34 enable access to anyone of a plurality of concentric tracks or circumvolutions of a spiral track for recording and recovering data on and from the disk. Linear actuator suitably mounted on frame 35, radially moves carriage 34 for enabling the track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode storing read only memory (ROM) 41 and a data and control signal storing random access memory (RAM) 42.

The optics of the recorder include an objective or focussing lens 45 mounted for focussing and tracking motions on head arm 33 by fine actuator 46. This actuator includes mechanisms for moving lens 45 toward and away from disk 30 for focussing, track following and seeking movements radially of disk 30; for example, for changing tracks within a range of 100 tracks so that carriage 34 need not be actuated each time a track adjacent to a track currently being accessed is to be accessed. Numeral 47 denotes the two-way light path between lens 45 and disk 30.

In magneto-optic recording, magnet 48 provides a weak magnetic steering field for directing the remanent magnetization direction of a small spot on disk 30 illuminated by laser light from lens 46. The laser light spot heats the illuminate spot on the record disk to a temperature above the Curie point of the magneto-optic layer (not shown, but can be an alloy of rare earth and transitional metals as taught by Chaudhari et al, U.S. Pat. No. 3,949,387). This heating enables magnet 48 to direct the remanent magnetization to a desired direction of magnetization as the spot cools below the Curie point temperature. Magnet 48 is shown as oriented in the "write" direction, i.e. binary ones are recorded on disk 30 normally are "north pole remanent magnetization". To erase disk 30, magnet 48 rotates so the south pole is adjacent disk 30. Magnet control 49 which is mechanically coupled to rotatable magnet 48 as indicated by dashed line 50, controls the write and erase directions. An electric coil can be used to replace magnet 48, as is known. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 36. The positioning of carriage 34 by actuator 36 is precisely controlled by control signals supplied by circuits 54 over line 55 to actuator 36. Additionally, the actuator control by circuits 54 is exercised by control signals travelling over lines 57 and 58 respectively for focus and fine tracking and switching actions of fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photo elements which respectively supply signals on four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by such intensity modulation. In this regard, data circuits 75 (later described) supply data indicating signals over line 78 to laser 67 for effecting such modulation. This modulated light beam passes through polarizer 70 (linearly polarizing the beam), thence through collimating lens 70 toward half mirror 60 for being reflected toward disk 30 through lens 45. Data circuits 75 are prepared for recording the microprocessor 40 supplied suitable control signals over line 76. Microprocessor 40 in preparing circuits 75 is responding to commands for recording received from a host processor 37 via attaching circuits 38. Once data circuits 75 are prepared, data is transferred directly between host processor 37 data circuits 75 through attaching circuits 38. Data circuits 75 also ancillary circuits (not shown) relating to disk 30 format signals, error detection and correction and the like. Circuits 75, during a read or recovery operation, strip the ancillary signals from the readback signals before supply corrected data signals over bus 77 to host processor 37 via attaching circuits 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remanent magnetization on disk 30 spot being accessed has a "north" or binary one indication. This passed light impinges on photo cell 82 for supplying a suitable indicating signal to differential amplifier 85. When the reflected light was rotated by a "south" or erased pole direction remanent magnetization, then polarizer 81 passes no or very little light resulting in no active signal being supplied by photocell 82. The opposite operation occurs by polarizer 83 which passes only "south" rotated laser light beam to photo cell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term data, as used herein, is intended to include any and all information-bearing signals, preferably of the digital or discrete value type.

The rotation position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

FIG. 3 illustrates, in simplified form, a portion of data circuits 75 used to record signals by activating laser 67 with signals over line 78. A sequencer 100 may be a shift register timer, or the like, timed by clock 101 (synchronized through the sync fields 16 and 25) by receiving timing pulses over line 101A for timing and sequences the recording operation to generate the format shown in FIG. 1. A write command is received from microprocessor 40 over line 102. Lines 103 from sequencer 100 carry function-enabling signals to the various writing or recording circuits for generating the format. All of the circuit portions receive the timing pulses from line 101A. Gap circuit 105, in response to a sequence signal received over a line 103, supplies a tone over line 106 through OR circuit 107 to the actual write or recording circuits 108. Circuits 108 convert the digital signals into a set of signals suitable for a recording in magneto-optic recording. These recording signals travel over line 78 to activate laser 67. When sequencer 100 has metered sufficient time for creating the gap 15, then a sync pattern is generated by circuits 110. Sequencer 100 enables circuits 110 to supply the sync signals over line 111 through OR circuit 107 to write circuits 108. Such pattern may be a symmetrical square wave. When sequencer 100 determines a sufficient sync pattern 16 has been recorded, it then activates mark pattern circuit 112 through its line 103 to send a 10000100001 mark pattern (FIG. 1A) over line 113 to write circuits 108. The direction of the biasing magnetic field from magnet 48 determines if the magnetic pattern is, in fact, recorded to respectively produce readback signals 28 or 29. Other circuits not shown in FIG. 3 enable the recording of data by supplying the data signals through OR circuit 107 to write circuits 108. It is to be appreciated that various circuits, such as circuits 105, 110 and 112, can be repeated for each portion of the format or the functions can be shared, i.e., gap circuits 105 can be used for recording both gaps 15 and 23 as is known in the recording arts.

Figure 4:
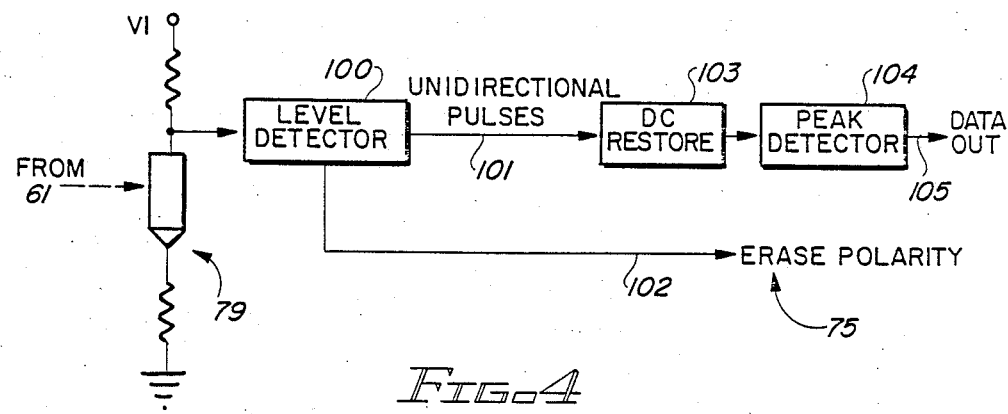
FIG. 4 is a simplified diagram of readback circuits usable in the FIG. 2-illustrated recorder-reader.

FIG. 4 is a simplified showing of a readback circuit usable herein. FIG. 4 illustrates circuits 79 as a single transistor with light impinging on the transistor as indicated by the dashed line arrow labeled "from 61". Level detector 100 determines the erasure direction as described later with respect to FIG. 5 to supply unidirectional data-indicating pulses over line 101 to a DC restore circuit 103. The DC restore circuit supplies its output signals to peak detector 104. Detector 104 supplies detected peak signals as data over line 105 for clock timing, data detection, error detection and correction as is well known. Circuits 100–104 are all a part of data circuits 75.

Figure 5:
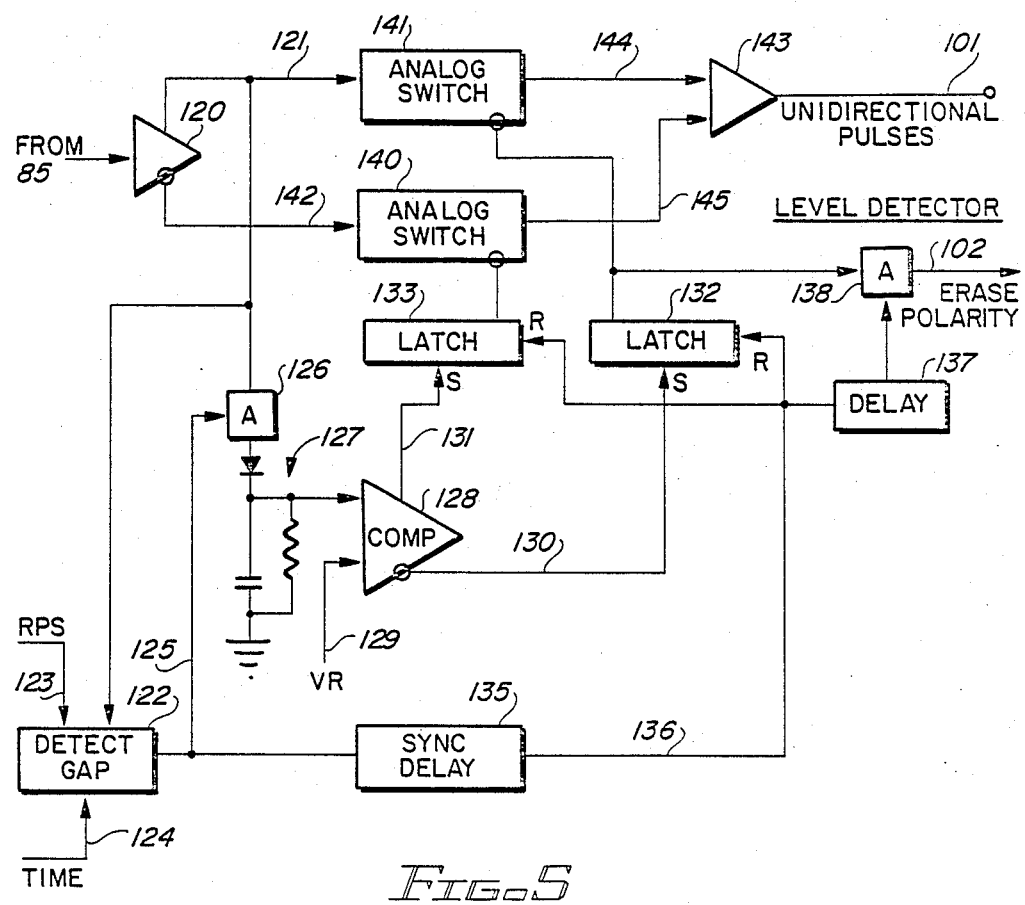
FIG. 5 is a diagram illustrating the detection of an erasure-direction indicating mark and subsequent control of the readback of information-bearing signals based upon such detection.

FIG. 5 details the construction of level detector 100. The input signal to the level detector is received from differential amplifier 85 (FIG. 2) within detector 79. Differential amplifier 120 supplies first polarity signals over line 121 and opposite polarity or inverted signals over line 142. The line 121 signals travel to detect gap circuit 122 which is activated by an RPS (rotational-position sensing) circuit not shown which indicates the rotational position of the desired gap. Such rotational position control is well known in the magnetic recording art. The activating signal on line 123 activates the detect gap circuit 122 which is time limited in operation by a timeout signal received over line 124, preferably from the RPS circuit (not shown). When a gap 15 is detected by sampling the signals on line 121, a gap-indicating signal travels from detect gap circuit 122 over line 125 to activate analog AND circuit 126 to pass the sync 16 signal and the mark signal 17 to analog integrator circuit 127. Since the sync signals are symmetrical, the net effect of integration is zero. When a mark signal is supplied, the mark 17 integration is either positive (read signal 29) or negative (read signal 28).

Comparators 128 compares the mark integrated signal with a voltage reference VR on line 129. When comparator 131 detects signal pattern 28 (negative integration), it supplies an activating signal over line 130 to set latch 132 to a first state. The arrangement is such that the gap signal supplied over line 125 is delayed through a sync delay circuit 135, thence travels over line 136 to reset the latches 132 and 133 in preparation for detection of mark 17. This readback action closes both analog switches 140 and 141 so that no signals are supplied to line 101. When comparator 131 completes its mark 17 detection, one and only one of the latches 132, 133 is set to the active condition for respectively activating or closing analog switches 140, 141 to pass either the first positive signals on line 121 or the negative signals 142, respectively for the south or north erasure direction. Analog switch 141 passes the first positive signals over line 144 through differential amplifier 143 to line 101 as a first set of unidirectional pulses. When the erasure direction is reversed, the negative signals supplied over line 142 are passed by analog switch 140 over line 145 to the negative input of differential amplifier 143. Amplifier 143 inverts the polarity of these signals to supply positive signals over line 101 to the DC restore circuit 103. For purposes of synchronization, by circuits not shown, latch 132 may be set to the active condition while latch 133 is set to the inactive condition. This results in analog switch 141 being activated to pass the gap and the sync signals 15 and 16. The arrangement shown in FIG. 5 causes both switches 140, 141 to be closed intermediate to reading of the mark signal 17 and ID signal 18.

The erase polarity can be electrically indicated by the level detector 100. This indication is achieved by delay circuit 137 delaying the gap signal from line 136 to activate AND circuit 138 for passing the output of latch 132 as an erase polarity-indicating signal on line 102.

The gap 23 of FIG. 1 is not detected by circuit 127 in that the RPS signal over line 123 is absent when gap 23 is being scanned. Accordingly, the detect gap circuit 122 then supplies no detected gap signal on line 125 keeping AND circuit 126 closed. Note that the duration of the detect gap signal is equal to the time that beam 47 is scanning both the gap sync and mark fields 15, 16, and 17 of FIG. 1.

Figure 6:
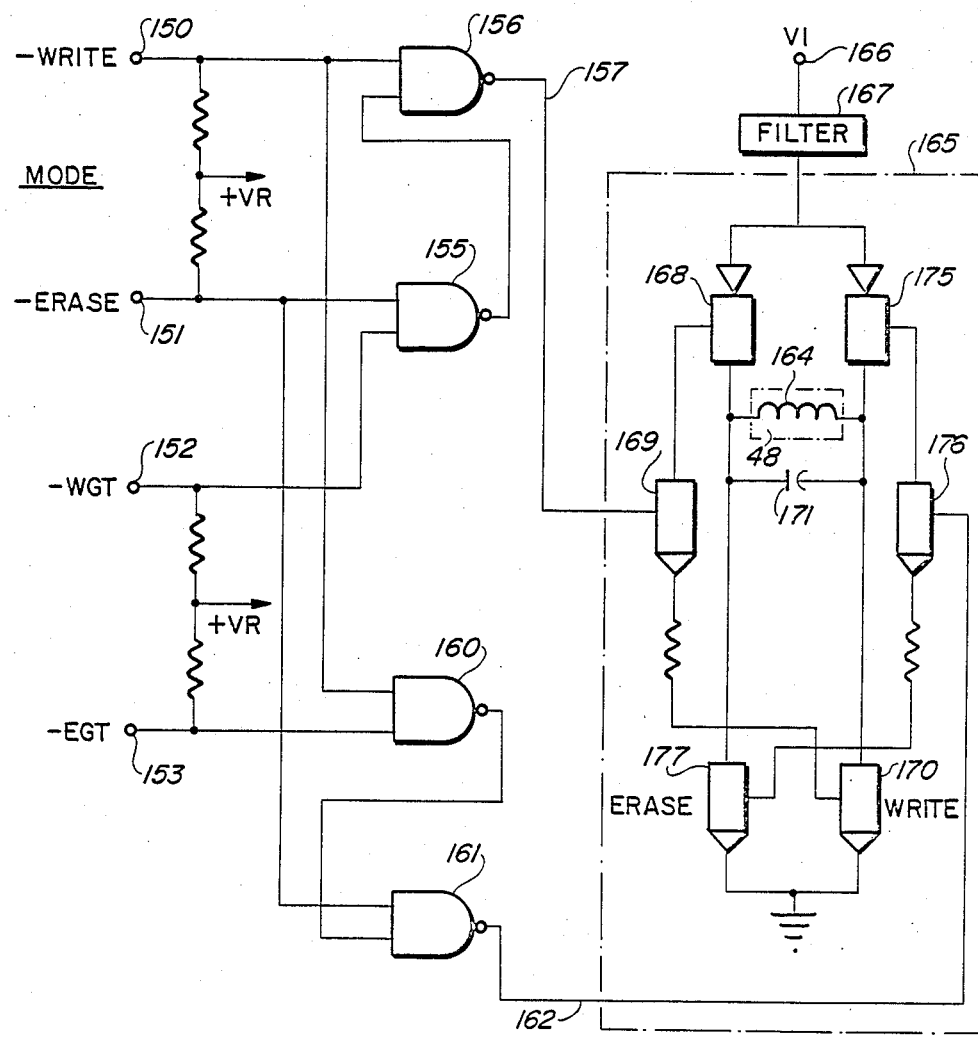
FIG. 6 is a schematic diagram illustrating control of a recording direction for the FIG. 2-illustrated recorder-reader.

Referring next to FIG. 6, a control circuit for controlling the biasing magnetic field (represented by magnet 48) is described. The circuit is a portion of control circuits 49. Microprocessor 40 supplies a write or erase mode control signal respectively to terminals 150 or 151. The mode is selected by a negative going signal. Similarly, a write gate or erase gate signal (WGT or EGT) is supplied to terminals 152, 153, respectively. A first NOR circuit 155 compares the erase mode signal on terminal 151 with the write gate signal on terminal 152. If the two signals are different, then the output signal from NOR circuit 155 is compared with the write mode signal on terminal 150 by NOR circuit 156. If these two signals are different, then NOR circuit 156 supplies an activating signal over line 155 to activate the coil controlling circuit 165, later described, to either the write or record mode. In a similar manner, NOR circuit 160 compares the signals on terminals 150 and 153 for supplying an activating signal during an erase mode to NOR circuit 161. Circuit 161 then passes the erase signal on terminal 151 over line 166 to circuits 165 for causing the erase mode to be instituted. In the erase mode, the magnetic field imposed upon disk 30 is a south field, while in the write mode, a north field is imposed on disk 30.

A purpose of circuit 165 is to control direction and amount of current flow through coil 164 which provides a magnetic field to be imposed on disk 30 as represented in FIG. 2 by magnet 48. When a magnet 48 is provided, the coil 164 may be used to rotate or detent the magnet between its two stable positions, i.e., the north and south poles, respectively adjacent disk 30.

For current flow through coil 164, the first voltage supply V1 at 166 supplies electrical power through a suitable filter 167. Two transistors 168 and 175 are alternately actuated between erase and write conditions by the signals on lines 157 and 162. When the signal on line 157 is relatively positive, transistor 169 conducts current causing transistor 168 to supply current to one end of coil 164. Additionally, transistor 169 emitter drives transistor 170 to current conduction for taking current from the other end of coil 164 to ground reference potential. The transistors 175, 176, 177 are nonconductive during this state of operation.

For causing erase current, the flow through coil 164 is to be in the opposite direction to the write or recording current, the transistor 175 is caused to conduct current from filter 167 to the other end of coil 164. The relatively positive signal on line 162 causes transistor 176 to bias transistor 175 to current conduction. Additionally, transistor 176 emitter drives transistor 177 to current conduction. Accordingly, erase current flows from filter 167 through transistor 165, thence coil 164 and transistor 177 to ground reference potential. During the erase current mode, transistors 168, 169 and 170 are nonconductive. Capacitor 171 may be placed across the coil 164 for electrical transient suppression.

While the invention has been particularly shown and described with reference to preferred embodiments thereof, it will be understood by those skilled in the art that various changes in form and details may be made therein without departing from the spirit and scope of the invention.

What is claimed is:

1. In a data recorder adapted to record information-bearing signals onto a magnetic record member along record tracks and to sense signals recorded on the magnetic record member along said record tracks;

the improvement including, in combination:

magnetic biasing means for supplying a magnetic field to a magnetic record member in the data recorder said magnetic field identifies one of two recording directions, and said magnetic biasing means including means to alternate the recording directions with one of said recording directions being an erasure direction and the second one of said directions being a data-indicating direction;

indication means operatively coupled to said magnetic biasing means for indicating the recording directions for predetermined portions of said magnetic record member;

direction means operatively coupled to said indication means for sensing said magnetic field direction for indicating said recording directions at said predetermined portions respectively;

erasure control means connected to said direction means for indicating a magnetic erasure direction being the same as said indicated recording direction irrespective if one of the recording directions is for erasure or for data-indicating direction and the data-indicating direction being reversed from said indicated recording direction; and data channel means connected to said erasure means and being operatively coupled to said magnetic record member for recording and reading information-bearing signals on to and from said magnetic record member in accordance with said erasure means indication such that the erasure and recording directions on said magnetic record member alternate on said magnetic record member between said predetermined portions.

2. In the invention set forth in claim 1, further including, in combination:

said indication means consists of an area on said magnetic record member in each of said predetermined portions and wherein said data channel means operatively coupled the indications means to said magnetic biasing means; and format means in said data channel means for recording in said indication means and erasure direction mark with a signal pattern that indicates said recording directions of, said magnetic field when said erasure direction mark is recorded.

3. In the invention set forth in claim 2, further including, in combination:

said format means being operative to record said erasure direction mark having a signal pattern exhibiting symmetry along the length of a record track in which the erasure-direction mark is recorded.

4. In the invention set forth in claim 3, wherein said format means is further operative to record said erasure-direction mark with a predetermined number of one-half wavelengths which have an extent along the length of the record track in which recorded comparable to longer wavelengths of data signal recorded therein.

5. In the invention set forth in claim 3, further including, in combination:

erasure override means in said data channel means for actuating said biasing to supply a constant erasure direction biasing signal to predetermined ones of said predetermined portions for erasing all of said predetermined portions to said erasure direction.

6. In the invention set forth in claim 5, further including, in combination:

said magnetic record member having a recording layer with magneto-optic characteristics;

said data channel means including thermal energy radiant means for emitting a beam of radiation for selectively feeding a small portion of said magneto-optic layer;

beam directing means optically interposed between said thermal energy radiation means and said magnetic record member for directing said beam of radiation to an addressed spot on said magnetic record member, addressing means connected to said beam direction means for actuating same to direct the beam of radiation to an addressed spot; and said beam directing means directing said beam of radiation onto said magnetic record member to be coincident in space with said magnetic biasing field for recording information onto the magnetic record member in the area that is thermally excited by said beam of radiation.

7. The invention set forth in claim 6, wherein said magnetic biasing means consists of an electromagnetic coil and said magnetic biasing means including circuit means for actuating said coil to emit the biasing field as having either a north or south pole at said magnetic record member.

8. The invention set forth in claim 6, wherein said magnetic biasing means include a rotatable permanent magnet mounted in proximity to said magnetic record member and having rotatable control means for rotating the magnet for providing first and second direction magnetic biasing fields.

9. The invention set forth in claim 1, wherein said indication means comprises an area in each of said predetermined portions for receiving an erasure direction indication mark and said data channel means operatively coupled the indication means to said direction means and said magnetic biasing means be indisposed with respect to the magnetic record member to half the magnetic biasing field through areas of said indication means; and signal circuit means in said data channel means responsive to the data channel means for reading said erasure direction indication mark to selectively invert output data indications from said data circuit means and further including data detector means for detecting polarity signals read back from said magnetic record member for supplying said output signals and supplying signals to said signal circuit means for determining the erasure direction.

10. The invention set forth in claim 9, further including, analog switch means in said data channel means and coupled to said data detector and connected to said signal circuit means for selectively inverting at least one signal of the polarity signals read back from said magnetic record member.

11. The invention set forth in claim 10, wherein said erasure direction indicating mark consists of a signal pattern symmetrical with respect to a direction of scanning of said record member by the data channel means; and comparator means in said signal circuit means including an integrator for integrating the signal pattern of said erasure direction indicating mark for indicating the erasure direction and being coupled to said analog switch means for controlling same to selectively invert the read back data signal.

12. The invention set forth in claim 11, wherein said erasure direction indicating mark includes one or more one-half wavelengths within said signal pattern which wavelengths have lengths comparable to a longest one-half wavelength of data recorded on said magnetic record member.

13. The invention set forth in claim 12, wherein said data detector includes a level detector receiving unidirectional pulses from said analog switch means representative of data read from said magnetic record member;

a DC restore connected to said level detector for receiving said unidirectional pulses and restoring the DC reference value thereto; and peak detector means in said data detector means coupled to said DC restore for receiving signals from the DC restore for peak detecting same for indicating the data read from said magnetic record member.

14. The invention set forth in claim 13, wherein said magnetic record member has a recording layer exhibiting a magneto-optic property and said data channel means activating a laser means to emit a beam irradiation having linear polarization;

beam directing means optically interposed between the laser means and said magnetic record member for directing the linearly-polarized light to said magnetic record member such that the magnetic record member reflects the linearpolarized light with a predetermined Kerr rotation and direction indicative of the stored information; and optical detector means disposed in said data channel means for optically intercepting the reflected light and detecting same supplying the detective signal to said analog switch means.

15. The invention set forth in claim 14, wherein said signal pattern consists of a series of three binary one signals with a plurality of binary zero signals interposed between the adjacent binary one signals said plurality of binary zero signals being three or greater with said binary zero signals being said one-half wavelength said data channel means recording said pattern such that the binary one signal are in the recording direction and the binary zero signals are in the erasure direction as determined by said magnetic biasing means and said integrator responding to the binary zero signals for indicating the erasure direction.

* * * * *